(12) United States Patent
Nakazawa et al.

(10) Patent No.: US 11,545,287 B2
(45) Date of Patent: Jan. 3, 2023

(54) DUST CORE

(71) Applicant: TDK CORPORATION, Tokyo (JP)

(72) Inventors: Ryoma Nakazawa, Tokyo (JP);
Yousuke Futamata, Tokyo (JP);
Takeshi Takahashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 28 days.

(21) Appl. No.: 15/694,509

(22) Filed: Sep. 1, 2017

(65) Prior Publication Data

US 2018/0068771 A1    Mar. 8, 2018

(30) Foreign Application Priority Data

Sep. 2, 2016  (JP) .............................. JP2016-172172

(51) Int. Cl.
| | | |
|---|---|---|
| *H01F 1/24* | (2006.01) | |
| *H01F 3/08* | (2006.01) | |
| *B22F 9/02* | (2006.01) | |

(Continued)

(52) U.S. Cl.
CPC ................ *H01F 1/24* (2013.01); *B22F 9/026* (2013.01); *B29B 7/90* (2013.01); *B29C 43/003* (2013.01); *C22C 38/00* (2013.01); *C22C 38/02* (2013.01); *C22C 38/06* (2013.01); *C22C 38/08* (2013.01); *C22C 38/10* (2013.01); *C22C 45/02* (2013.01); *H01F 3/08* (2013.01); *B22F 1/16* (2022.01); *B22F 2998/10* (2013.01); *B22F 2999/00* (2013.01); *B29K 2105/16* (2013.01); *B29K 2505/00* (2013.01); *B29K 2995/0008* (2013.01);

(Continued)

(58) Field of Classification Search
CPC .... B22F 1/02; B22F 2999/00; B22F 2998/10; B22F 9/026; B22F 1/0011; B22F 3/1039; B22F 9/082; C22C 2202/02; C22C 33/02; C22C 38/00; B29B 7/90; B29C 43/003; B29K 2105/16; B29K 2505/00; B29K 2995/0008; H01F 1/24; H01F 41/0246; H01F 3/08
See application file for complete search history.

(56) References Cited

U.S. PATENT DOCUMENTS

| | | |
|---|---|---|
| 2001/0019771 A1 | 9/2001 | Elgelid et al. |
| 2010/0044618 A1 | 2/2010 | Ishimine et al. |

(Continued)

FOREIGN PATENT DOCUMENTS

| | | |
|---|---|---|
| CN | 101578669 A | 11/2009 |
| JP | H11-238613 A | 8/1999 |

(Continued)

*Primary Examiner* — Holly Rickman
*Assistant Examiner* — Linda N Chau
(74) *Attorney, Agent, or Firm* — Oliff PLC

(57) ABSTRACT

A dust core including a metal magnetic powder and a resin, in which the metal magnetic powder shows a particle diameter of more than 0 μm and 200 μm or less, a number percentage of 5.0% or more of metal magnetic particles among the metal magnetic particles composing the metal magnetic powder are at least partially surface-coated with an inorganic compound including an alkaline earth metal, in a coating part coating the metal magnetic particles, an amount of the alkaline earth metal is 10.0 mass % or more, when a total amount of a metal element included in the coating part is 100 mass %, is provide. The dust core is superior in a corrosion-resistance.

17 Claims, 4 Drawing Sheets

(51) Int. Cl.
*C22C 38/00* (2006.01)
*C22C 38/02* (2006.01)
*C22C 38/06* (2006.01)
*C22C 38/08* (2006.01)
*C22C 38/10* (2006.01)
*C22C 45/02* (2006.01)
*B29B 7/90* (2006.01)
*B29C 43/00* (2006.01)
*B22F 1/16* (2022.01)
*B29K 105/16* (2006.01)
*B29K 505/00* (2006.01)
*H01F 41/02* (2006.01)

(52) U.S. Cl.
CPC ...... *C22C 2202/02* (2013.01); *H01F 41/0246* (2013.01)

(56) References Cited

U.S. PATENT DOCUMENTS

| | | | | |
|---|---|---|---|---|
| 2013/0228717 | A1* | 9/2013 | Harada | H01F 1/26 252/62.55 |
| 2016/0086715 | A1* | 3/2016 | Lin | C22C 38/34 336/221 |

FOREIGN PATENT DOCUMENTS

| | | |
|---|---|---|
| JP | 2003-522298 A | 7/2003 |
| JP | 2009-158652 A | 7/2009 |
| JP | 2010-62424 A | 3/2010 |
| JP | 2010-118587 A | 5/2010 |
| JP | 2015-12273 A | 1/2015 |

\* cited by examiner

DUST CORE

BACKGROUND OF THE INVENTION

1. Field of the Invention

The present invention relates to a dust core.

2. Description of the Related Art

As an electronic component used for the power circuit of various electronic devices for a consumer use and also for an automobile use, coil type electronic components such as a transformer, a choke coil, an inductor, etc. are known. In addition, such as a motor is known as a machine component utilizing the coil.

Such coil type electronic components and the motor have a configuration in which a coil, a winding wire, of an electrical conductor is disposed inside or circumference of the magnetic body exhibiting a predetermined magnetic characteristic. Various materials can be used for the magnetic body corresponding to a desired characteristic. Conventionally, in the coil type electronic components, the ferrite material having a high permeability and a low power loss are used for the magnetic body.

Recently, in order to correspond to the realization of a small size and a large current of the coil type electronic components, a metal ferromagnetic material, having higher saturation magnetic flux density than the same of the ferrite material and showing a good DC superimposing characteristic under a high magnetic field, is attempted to use as the magnetic body. A Fe based alloy, etc. are exemplified as such metal ferromagnetic material, and for instance, the dust core obtained by pressure molding the metal magnetic powder including the metal magnetic particles is widely used.

Such dust core is used in various environments. Thus, not only a high performance but also a high reliability is required. As the reliability, a corrosion-resistance is exemplified.

However, a material composing the dust core is a metal mainly composed of Fe, therefore, there was a problem that material configuring the dust core was inferior in a corrosion-resistance, especially in a rustproof property, under a moist condition.

For instance, according to Patent Article 1, the metal magnetic body includes Cr to improve the corrosion-resistance. And in addition, on the surface of the metal magnetic body particles, a glass coating including $SiO_2$, etc. is formed to improve the corrosion-resistance thereof. However, there is a problem that the corrosion-resistance of the glass coating is low. Thus, it is required to thicken the glass coating, in order to realize sufficient corrosion-resistance. Consequently, it is considered that the interval between the metal magnetic particles is enlarged, and the permeability $\mu$ as the dust core is lowered.

Further, according to Patent Article 2, the corrosion-resistance is improved by coating ceramics and a resin on the magnetic component, in which the coil is formed inside. However, in order to perform such coating, a heat treatment of the dust core at a high temperature of 800° C. or more is required. There was a problem that the insulation of the winding breaks down, when including an insulation processed copper winding in the dust core exposed to such high temperature.

Patent Article 3 mentions, in an object to realize electrical insulation between particles, a method forming a layer including Mg on the surface of Fe based soft magnetic powder. However, with the method described in Patent Article 3, there was a problem that MgO on the surface was not capable to be more than 5 wt % or more.

In addition, Patent Articles 4 and 5 mention including MgO in the dust core as the additive particles. However, MgO extends throughout the dust core, when including MgO as additive particles. Thus, a large amount of the MgO particle is required to improve the corrosion-resistance. Consequently, it is considered that the interval between the metal magnetic particles is enlarged, and that the permeability $\mu$ of the dust core lowers.

Patent Document 1: JP 2010-62424A
Patent Document 2: JP 2010-118587A
Patent Document 3: JP 2003-522298A
Patent Document 4: JP H11-238613A
Patent Document 5: JP 2015-12273A

DISCLOSURE OF THE INVENTION

Means for Solving the Problems

According to Patent Document 3, a layer including Mg is formed on the surface of the particles in view of an electrical insulation between the particles. According to the degree of Mg concentration described in Patent Document 3, however, it was determined to be insufficient for providing the corrosion-resistance to the metal magnetic particles.

The present invention was devised considering the above matters, and an object of the invention is to provide a dust core superior in a corrosion-resistance.

As a result of examining the corrosion-resistance, especially the corrosion-resistance (a rust proof property) with respect to an oxidation, of the metal magnetic particles configuring the dust core, the present inventors focused on that the rust easily progresses in an acid or neutral environment. The present inventors have found that the dust core showed a good corrosion-resistance, when including a prescribed quantity or more of the materials required to make a surface of the metal magnetic particles configuring the dust core an alkaline environment, which lead to a completion of the invention.

Namely, an embodiment of the invention is

[1] A dust core including a metal magnetic powder and a resin, in which
the metal magnetic powder shows a particle diameter of more than 0 μm and 200 μm or less,
a number percentage of 5.0% or more of metal magnetic particles among the metal magnetic particles composing the metal magnetic powder are at least partially surface-coated with an inorganic compound including an alkaline earth metal,
in a coating part coating the metal magnetic particles, an amount of the alkaline earth metal is 10.0 mass % or more, when a total amount of a metal element included in the coating part is 100 mass %.

[2] The dust core according to [1], in which the alkaline earth metal is Mg.

Among the metal magnetic particles configuring the dust core mentioned hereinbefore, the ratio of the metal magnetic particles coating the inorganic compound including an alkaline earth metal, especially preferably Mg, is set within the above range. And the ratio of the inorganic compound including the alkaline earth metal in the coating part is set a predetermined range or more. Consequently, the dust core is capable to show a good corrosion-resistance.

[3] The dust core according to [1] or [2], in which a number percentage of the metal magnetic particles, coated with the inorganic compound including the alkaline earth metal among the metal magnetic particles having a particle diameter of 10.0 μm or less, is 60.0% or more in the metal magnetic powder.

A certain ratio or more of particles, having a particle diameter of 10.0 μm or less and large specific surface areas and are easy to generate rust, is coated with an inorganic material including the alkaline earth metal. Thus, the dust core shows a good corrosion-resistance.

[4] The dust core according to any one of [1] to [3], in which a number percentage of the metal magnetic particles, coated with the inorganic compound including the alkaline earth metal among the metal magnetic particles having a particle diameter of 5.0 μm or less, is 80.0% or more in the metal magnetic powder.

A certain ratio or more of particles, having a particle diameter of 5.0 μm or less and larger specific surface areas and are easier to generate rust, is coated with an inorganic material including the alkaline earth metal. Thus, the dust core shows a good corrosion-resistance.

[5] The dust core according to any one of [1] to [3], in which a number percentage of the metal magnetic particles, coated with the inorganic compound including the alkaline earth metal among the metal magnetic particles having a particle diameter of 25.0 μm or more, is 50.0% or less in the metal magnetic powder.

Both the corrosion-resistance and the certain magnetic characteristic can be attained by coating the metal magnetic particles having a small particle diameter with the inorganic compound selectively including the alkaline earth metal.

[6] The dust core according to any one of [1] to [5], in which the metal magnetic particles coated with the inorganic compound including the alkaline earth metal show $$0.0050 < Sc/Sm < 0.1000$$

when

Sm is a cross-sectional area of the metal magnetic particles, and

Sc is a cross-sectional area of a part where the metal magnetic particles are coated with the inorganic compound including the alkaline earth metal.

A good corrosion-resistance is shown, and deterioration of the magnetic characteristic is suppressed by including the inorganic compound which includes the alkaline earth metal, by setting Sc/Sm is within the above range.

[7] The dust core according to any one of [1] to [6], among the metal magnetic particles composing the metal magnetic powder, the metal magnetic particles, other than the metal magnetic particles coated with the inorganic compound including the alkaline earth metal, are at least partially surface-coated with an insulating material, other than the inorganic compound including the alkaline earth metal.

As mentioned above, a good corrosion-resistance is shown by using a plurality of materials coating the metal magnetic particles, and in addition, deterioration of the magnetic characteristic can be suppressed by including the inorganic compound which includes the alkaline earth metal.

[8] The dust core according to [7], in which the insulating material is an oxide including Si.

The above mentioned effect can be enhanced by making the insulating material to an oxidized material including Si.

[9] The dust core according to any one of [1] to [8], in which the metal magnetic particles composing the metal magnetic powder include Fe or Fe and Si.

The above-mentioned effect becomes remarkable by making materials of the metal magnetic particles to the composition mentioned hereinbefore.

Figure 1:
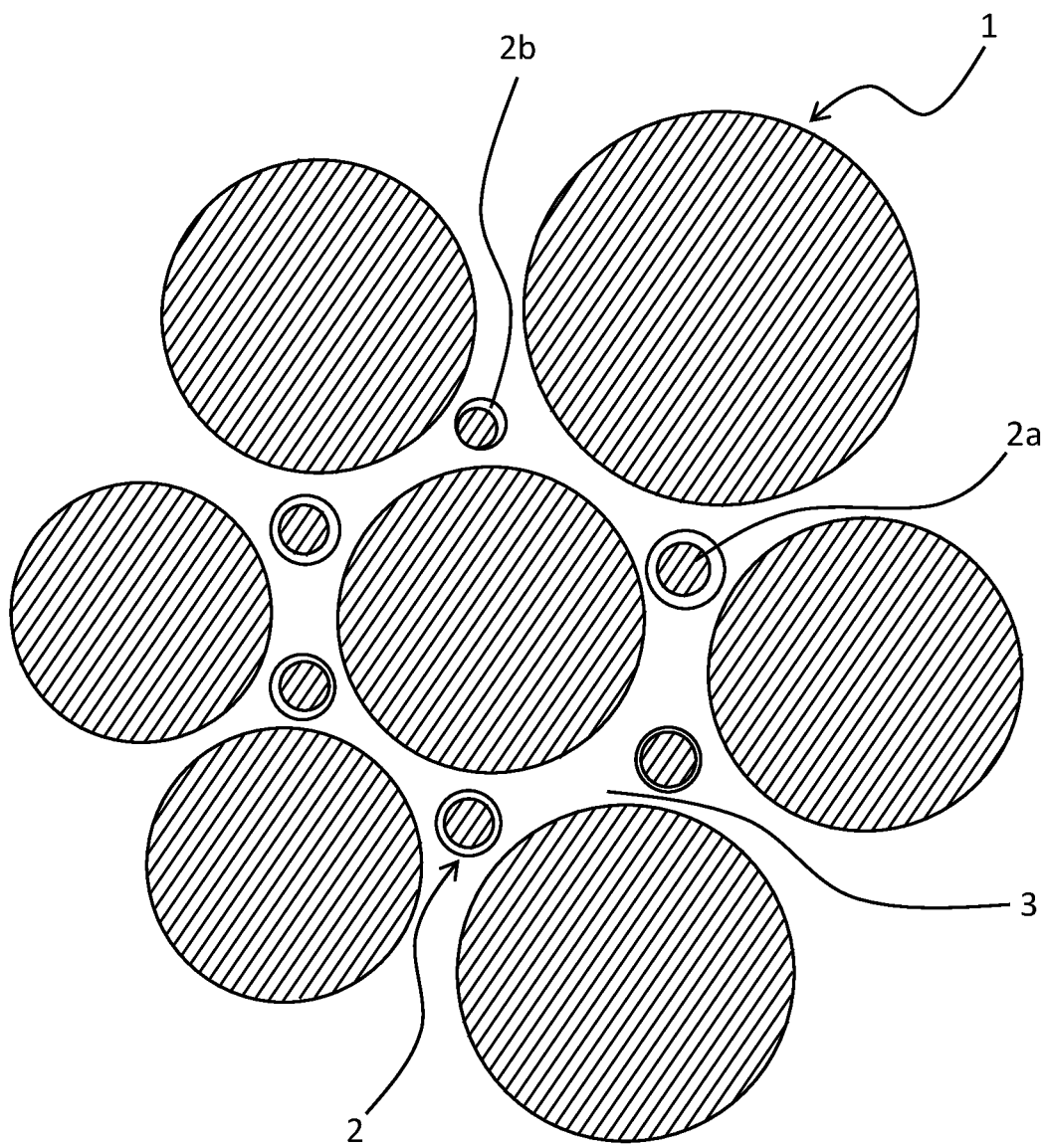
FIG. 1 is a cross-sectional schematic view describing the existence state of the metal magnetic particles inside the dust core.

Hereinafter, the present invention will be described in detail in the following order, referring to the concrete embodiments.

1. Dust core
   1.1 Metal magnetic powder
      1.1.1 Metal magnetic particles
      1.1.2 Coating part
   1.2 Resin
2. Manufacturing method of the dust core
3. Effects of the embodiment (1. Dust Core)

The dust core according to the present embodiments have the metal magnetic powder and the resin, and is fixed to a predetermined form by binding a plurality of the metal magnetic particles constituting the metal magnetic powder via the resin.

Such dust core is preferably used as the core of the coil type electronic components. For instance, the dust core may be a coil type electronic component in which an air-core coil where a wire is wound around is buried in said dust core of a predetermined shape, or a coil type electronic component in which a wire is wound around on the surface of the dust core for a predetermined winding number. A formation of the core where the wire wound around may exemplify FT type, ET type, EI type, UU type, EE type, EER type, UI type, drum type, toroidal type, pot type, cup type, etc.

(1.1 Metal Magnetic Powder)

The metal magnetic powder configuring the dust core according to the present embodiment is an aggregate of a plural number of the metal magnetic particles. According to the present embodiment, the particle size distribution of the metal magnetic powder is within a range of more than 0 μm and 200 μm or less. In addition, according to the present embodiment, the particle diameter of the metal magnetic particles is measured as mentioned below.

A field of 1 mm×1 mm on the cross section of the dust core is observed by scanning electron microscope (SEM), an area of the metal magnetic particles was calculated by an image analysis, and a value calculated as a diameter of a circle equivalent to said area is determined a particle diameter. Then, the particle diameter is counted from smallest to largest, a particle diameter d10 of the metal magnetic particles with 10% cumulative frequency, a particle diameter d50 of the metal magnetic particles with 50% cumulative frequency, a particle diameter d90 of the metal magnetic particles with 90% cumulative frequency, a particle diameter d99 of the metal magnetic particles with 99% cumulative frequency are calculated. Note that the particle diameter measured as above is the particle diameter including the coating part mentioned below.

In addition, according to the present embodiment, in order to obtain a predetermined magnetic characteristic, a certain amount of particles largely contribute to the magnetic characteristic, namely, particles having a large particle diameter is preferably contained in the metal magnetic powder. In concrete, d90 of the particle size distribution according to the metal magnetic powder is preferably within 30 to 60 µm.

1.1.1 Metal Magnetic Particles

In the present embodiment, materials of the metal magnetic particles preferably include Fe. In concrete, a pure iron, a Fe based alloy, a Fe—Si based alloy, a Fe—Al based alloy, a Fe—Ni based alloy, a Fe—Si—Al based alloy, a Fe—Co based alloy, a Fe based amorphous alloy, a Fe based nano crystal alloy, etc. are exemplified. Among all, the pure iron or the Fe—Si based alloy is more preferable.

In addition, according to the present embodiment, the metal magnetic powder can be composed with a plural number of the metal magnetic particles of the same material or of the different materials coexisting. For instance, the metal magnetic powder may be a mixture of a plural number of the Fe based alloy particles and the same of the Fe—Si based alloy particles.

In case when the metal magnetic powder is composed of different materials of two kinds or more, a particle size distribution of the metal magnetic particles composed of one material and the same of the other material may be different.

Note, said different materials exemplifies a case in which elements composing the metal or the alloy are different, a case in which the compositional elements are the same but its compositional ratio is different, etc.

(1.1.2 Coating Part)

According to the present embodiment, in case when a number of the metal magnetic particles included in the metal magnetic powder is 100%, a number percentage of 5.0% or more, preferably 7.5% or more, and more preferably 10.0% or more of the metal magnetic particles are at least partially surface-coated with the inorganic compound including the alkaline earth metal. Thus, said metal magnetic particles have the coating parts on the surfaces thereof. Note, the other metal magnetic particles may be coated or not coated.

According to the present embodiment, "a surface of particles coated with a material" means, the material contacts the surface and fixes to coat the contacting area. In addition, the coating part coating the surface of the metal magnetic particles may coat at least a part of the particle surface, however, it is preferable to coat the whole surface. Further, the coating part may continuously coat or discontinuously coat the particle surface.

In addition, the coating part may be composed of the inorganic compound including the alkaline earth metal exclusively, the other compounds other than the inorganic compound including the alkaline earth metal, or the mixture thereof. In the present embodiment, in case when a total amount of the metal element included in the coating part is 100 wt %, an amount of the alkaline earth metal is 10.0 wt % or more and preferably 25.0 wt % or more in the coating part of the metal magnetic particles coated with the inorganic compound including the alkaline earth metal. It is capable to make the density of the alkaline earth metal existing in the coating part high, sufficient to exhibit the rustproof property, when the amount of alkaline earth metal is within the above range.

In case when the number percentage of the metal magnetic particles coated with the inorganic compound including the alkaline earth metal and the ratio of the amount of the alkaline earth metal in the coating part are both within the above range, the dust core is superior in corrosion-resistance, particularly in rustproof property.

The reason that the dust core according to the present embodiment show a good corrosion-resistance is not obvious, however, for instance, the following assumption can be established. Namely, when the number percentage of the metal magnetic particles coated with the inorganic compound including the alkaline earth metal and the ratio of the amount of the alkaline earth metal in the coating part are both within the above range, it is considered that an environment near the surface of the metal magnetic particle surface is controlled to become an appropriate alkaline. As a result, even when water especially water including salinity exists in the surface or inside the dust core, the oxidation (the progress of the rust) of the metal magnetic particles are suppressed, and the obtained dust core is superior in corrosion-resistance, particularly in rustproof property.

A method of judging whether or not the surface of the metal magnetic particles is coated with the inorganic compound including the alkaline earth metal, is preferably a method which can quantitatively measure the amount of the metal elements included in the coating part. According to the present embodiment, a view field of 1 mm×1 mm is observed by SEM on a cross section of the dust core, and then an element mapping using an energy dispersive X-ray spectroscopy (EDS) attached to SEM is performed. By a compositional mapping image of the alkaline earth metal among the obtained element mapping, it is judged whether or not the surface of the metal magnetic particles is coated with the inorganic compound including the alkaline earth metal. As mentioned above, a number of particles coated with the inorganic compound including the alkaline earth metal are calculated, and then, a number percentage thereof with respect to whole particle number present within a visual field is obtained.

In addition, the method which can quantitatively measure the amount of the metal elements included in the coating part is also preferably used for a method to measure the total amount of the metal element and the amount of alkaline earth metal respectively included in the coating part. According to the present embodiment, using EDS attached to transmission type electron microscope (TEM), a quantitative analysis of an element in the coating part of the metal magnetic particles is performed, and then a ratio of the amount of the alkaline earth metal with respect to the total amount of metal included in the coating part is calculated. Said measurement was performed to 10 or more of the metal magnetic particles having the coating part, an average value thereof is determined an amount of the an alkaline earth metal with respect to the total amount of the metal element included in the coating part.

In addition, according to the present embodiment, by controlling the number percentage of the metal magnetic particles coated with the inorganic compound including the alkaline earth metal considering the particle diameter, the corrosion-resistance and a certain magnetic characteristics of the dust core can be achieved.

The metal magnetic powder generally has a certain particle size distribution, and the metal magnetic particles having a small particle diameter and the metal magnetic particles having a large particle diameter are mixed in the dust core, manufactured using the metal magnetic powder. As shown in FIG. 1, in the dust core including the metal magnetic powder having such particle size distribution and resin 3, metal magnetic particles 2 having relatively small particle diameter are present in a gap among metal magnetic particles 1 having relatively large particle diameter. The gap is, for instance, present among the three metal magnetic particles 1. A specific surface area of the particles having relatively small particle diameter is larger than the same of the particles having relatively large particle diameter.

While, the oxidation of the metal magnetic particles generates when contacting water. Thus, the oxidation is easily progressed when the contacting area, namely, the specific surface area increases, promoting the generation of the rust. Therefore, in order to enhance the corrosion-resistance, it is necessary to make the contacting area with water small. Thus, in the present embodiment, in the metal magnetic powder having the particle size distribution of more than 0 μm and 200 μm or less, the metal magnetic particles, having a relatively large specific surface area, namely having a relatively small particle diameter where rust is easy to generate, are selectively coated with the inorganic compound including the alkaline earth metal. As a result, the metal magnetic particles are not excessively coated, and a necessary and sufficient amount for exhibiting the corrosion-resistance is coated on said particles, and the corrosion-resistance is efficiently enhanced.

In concrete, according to the present embodiment, in the metal magnetic powder, the number percentage of the particles coated with the inorganic compound including the alkaline earth metal among the metal magnetic particles having the particle diameter of 10.0 μm or less is preferably 60.0% or more.

In particular, according to the present embodiment, in the metal magnetic powder, the number percentage of the particles coated with the inorganic compound including the alkaline earth metal among the metal magnetic particles having the particle diameter of 5.0 μm or less is preferably 80.0% or more.

Thus, the metal magnetic particles, having the particle diameter of 10.0 μm or less, sensitive to the corrosion-resistance and showing a small contribution to the magnetic characteristic, are selectively limited for the coat of the inorganic compound including the alkaline earth metal which enhances the corrosion-resistance, which leads to an efficient enhancement of the corrosion-resistance of the dust core.

Further, as mentioned above, referring to FIG. 1, the metal magnetic particles having a small particle diameter are present in a gap between the metal magnetic particles having a large particle diameter. As a result, even when coating part 2b is formed by coating metal magnetic particles 2a having a small particle diameter with the inorganic compound including the alkaline earth metal, the interval between the particles having a large particle diameter showing a large contribution to the magnetic characteristic is difficult to widen.

Therefore, according to the present embodiment, a number percentage of particles coated with the inorganic compound including the alkaline earth metal among the metal magnetic particles having the particle diameter of 25.0 μm or more in the metal magnetic powder is preferably 50.0% or less. In other words, it is preferable to limit the coat of the particle having a relatively small specific surface area with the inorganic compound including the alkaline earth metal.

Thus, deterioration of the magnetic characteristic due to the coat of the non-magnetic substance such as the inorganic compound including the alkaline earth metal is effectively suppressed, and effectively suppress the decline of a certain magnetic characteristic, such as permeability.

Conversely, even with the particles having a relatively large particle diameter (25.0 μm or more according to the present embodiment), the interval of the particles are easily widened causing deterioration of the permeability, when the particles are coated with the inorganic compound including a large amount of the alkaline earth metal.

A method of judging the ratio of the metal magnetic particles coated with the inorganic compound including the alkaline earth metal for each particle diameter, similar to the above method, can be the method judged by the compositional mapping image of the alkaline earth metal and the calculated particle diameter.

In addition, to obtain both the corrosion-resistance and the predetermined magnetic characteristic compatible, according to the metal magnetic particles coat by the inorganic compound including the alkaline earth metal, the following formula is preferable, when the cross-sectional area of said metal magnetic particles is Sm, and the cross-sectional area of a part, where the inorganic compound including the alkaline earth metal coats said metal magnetic particles, is Sc.

$$0.0050 < Sc/Sm < 0.1000$$

The corrosion-resistance is good while exhibiting the predetermined magnetic characteristic, when $Sc/Sm$ is within the above range. $Sc/Sm$ is more preferably 0.0055 or more, and further preferably 0.0300 or more. On the other hand, $Sc/Sm$ is more preferably 0.0950 or less, and further preferably 0.0750 or less.

The calculating method of $Sc/Sm$ is similar to the above method. An element analysis in the metal magnetic particles and coating part thereof is performed. An area occupied by the metal configuring the metal magnetic particles is calculated as Sm. An area occupied by the alkaline earth metal configuring the coating part is calculated as Sc. Then Sc is divided by Sm. The method is performed to 10 or more metal magnetic particles having the coating part, and an average value thereof is determined $Sc/Sm$.

Note, particles appear on the cross section of the dust core are evaluated when calculating $Sc/Sm$, however, the largest diameter of the particles may not appear on the cross section. Further, the same applies to the coating part. Therefore, $Sc/Sm$ may not reflect the coating amount of the coating part in the actual metal magnetic particles.

The inorganic compound including the alkaline earth metal according to the present embodiment exemplifies oxides or composite oxides of the alkaline earth metal, hydroxides of the alkaline earth metal, carbonates of the alkaline earth metal, halogenated substances of the alkaline earth metal, phosphates of the alkaline earth metal, and etc. Among all, the oxides of the alkaline earth metal are preferable.

In addition, Mg (magnesium), Ca (calcium), and Ba (barium) are exemplified, and Mg is particularly preferable in the present embodiment.

In addition, according to the present embodiment, it is preferable that a number percentage of 90% or more of the metal magnetic particles composing the metal magnetic powder are coated, and more preferable that all (100%) of the particles are coated. Namely, it is preferable that a number percentage of 90% or more of the metal magnetic particles composing the metal magnetic powder is particles coated with the inorganic compound including the alkaline earth metal and particles coated with a compound other than the inorganic compound including the alkaline earth metal. In this case, at least a part of the surface of the metal magnetic particles, other than the metal magnetic particles coated with the inorganic compound including the alkaline earth metal, is coated with the compound other than the inorganic compound including the alkaline earth metal, particularly with the insulating material.

In particular, both the corrosion-resistance and the predetermined magnetic characteristic are achieved at a higher level by setting the number percentage of the metal magnetic particles coated with the inorganic compound including the alkaline earth metal within the above ratio and coating the most of or all of the residual particles with the insulating material other than the inorganic compound including the alkaline earth metal.

Compounds other than the inorganic compound including the alkaline earth metal may be an inorganic compound or an organic compound. According to the present embodiment, as an insulating material other than the inorganic compound including the alkaline earth metal, the oxides including phosphates or Si are exemplified. The oxides including Si are particularly preferable.

Judging whether or not the metal magnetic particles, other than the metal magnetic particles coated with the inorganic compound including the alkaline earth metal, are coated with the insulating material other than the inorganic compound including the alkaline earth metal, can be performed by the particles in which the circumference thereof is coated with the insulating material, as similar to the above method.

(1.2 Resin)

A well-known resin can be used as the resin configuring the dust core. In concrete, various organic polymer resins, a silicone resin, a phenol resin, an epoxy resin, a water glass, etc. are exemplified.

(2. Manufacturing Method of the Dust Core)

According to the present embodiment, the dust core is manufactured using the above mentioned metal magnetic powder and the resin. Forming method of the coating part on the metal magnetic particles composing the metal magnetic powder is not particularly limited, and a well-known method can be used. For instance, the coating part can be formed by wet treating the metal magnetic particles. In concrete, the coating part can be formed by immersing the metal magnetic particles in a solution, in which the compound configuring the coating part, the precursor thereof, and etc., or by atomizing said solution to the metal magnetic particles, and then heat treating thereof.

The manufacturing method of the dust core is not particularly limited, and a well-known method can be adopted. First, the metal magnetic powder including the metal magnetic particles forming the coating part and a well-known resin as a binder are mixed, and a mixture thereof is obtained. In addition, when necessary, the obtained mixture can be made to a granulated powder. Then, the mixture or the granulated powder is filled in a mold and pressure molded thereof, and a molded body having a formation of the magnetic body, the dust core, to be manufactured. The dust core of a predetermined form, in which the metal magnetic particles are fixed, are obtained by performing a heat treatment to the obtained molded body. The coil type electronic components such as the inductor can be obtained by winding the wire around the obtained dust core for a predetermined number of times.

In addition, a molded body in which the coil is buried inside can also be obtained by filling the above-mentioned mixture or the granulated powder and the air-core coil formed by winding the wire around for a predetermined number of times in the mold. The coil buried dust core having a predetermined form can be obtained by heat treating the obtained molded body. The coil is buried inside said dust core, thus, the dust core functions as the coil type electronic components, such as the inductor.

(3. Effects of the Embodiment)

The present embodiment described in the above (1) and (2), at least a part of the surface of a predetermined number of the metal magnetic particles among the metal magnetic particles configuring the duct core is coated by the inorganic compound including the alkaline earth metal. In addition, the dust core is capable to show a good corrosion-resistance, especially a rust proof property, by setting the amount of the alkaline earth metal with respect to the total amount of the metal element, included in the inorganic compound including the alkaline earth metal, within a certain range.

Further, considering that the specific surface area of the particle becomes large as the particle diameter becomes small and the rust is easy to progress, and in addition, the contribution of the metal magnetic particles having a small particle diameter to the magnetic characteristic is small, an efficiency of the corrosion-resistance can be improved by selectively coating the metal magnetic particles having a relatively small particle diameter with the inorganic compound including the alkaline earth metal, and controlling the number percentage of the coated particle according to the particle diameter. In addition, an enlargement of the interval between particles, which has a large contribution to the magnetic characteristic, can be suppressed by limiting the number percentage of the particles having relatively large particle diameter coated with the inorganic particles including the alkaline earth metal. Consequently, both the corrosion-resistance and the magnetic characteristic can be attained.

Further, by making an area Sc, occupied by the inorganic compound including the alkaline earth metal included in the coating part, and an area Sm, occupied by the metal configuring the metal magnetic particles forming said coating part, within the above range, the corrosion-resistance is maintained superior, and at the same time, a predetermined magnetic characteristic, such as the permeability, is made good.

In addition, according to the embodiments above, most of or all of the metal magnetic particles, other than the metal magnetic particles coated with the inorganic compound including the alkaline earth metal, are coated with a compound other than the inorganic compound including the alkaline earth metal, especially the insulating materials such as Si, oxides, and etc. The corrosion-resistance and the magnetic characteristic can be both realized at a high level, by coating the surface of the metal magnetic particles as mentioned above.

Hereinbefore, preferable embodiments of the invention are described, but the invention is not limited thereto. The invention can be varied within a summary of the invention.

EXAMPLE

Hereinafter, the invention will be described referring to the examples, however, the invention is not limited thereto.

Example 1

First, eight kinds of powders, powders A to F, composed by the metal magnetic particles of a Fe—Si based alloy, having the same particle size distribution, were prepared as the metal magnetic powder. The coating part was not formed on the metal magnetic particles of powder A, and the coating part was formed on the metal magnetic particles of powder B-1 to powder F by the methods shown below.

Powder B-1 was coated by a wet coating method with the inorganic compound including MgO and $Al_2O_3$. First, the ionic crystals of Mg source and the same of Al source were dissolved in acetone, the powder B-1 was added to the acetone and mixed thereof, and slurried thereof. The obtained slurry was evaporated and dried, then the dried powder was heat treated at 600° C. for 10 h., and the coating part configured by the inorganic compound including MgO was formed on the metal magnetic particles.

Powder B-2 was coated by a wet coating method with the inorganic compound including BaO and $Al_2O_3$. First, the ionic crystals of Ba source and the same of Al source were dissolved in acetone, the powder B-2 was added to the acetone and mixed thereof, and slurried thereof. The obtained slurry was evaporated and dried, then the dried powder was heat treated at 600° C. for 10 h., and the coating part configured by the inorganic compound including BaO was formed to the metal magnetic particles.

Powder B-3 was coated by a wet coating method on the inorganic compound including CaO and $Al_2O_3$. First, the ionic crystals of Ca source and the same of Al source were dissolved in acetone, the powder B-3 was added to the acetone and mixed thereof, and slurried thereof. The obtained slurry was evaporated and dried, then the dried powder was heat treated at 600° C. for 10 h., and the coating part configured by the inorganic compound including CaO was formed on the metal magnetic particles.

Nickel phosphate was coated on powder C by a wet atomizing treatment. First, a nickel phosphate solution was wet atomized to powder C. The coating part configured by nickel phosphate was formed on the metal magnetic particles by heat treating the atomized powder C at 400° C. for 10 h.

A phenol resin was wet atomized to powder D, and the coating part configured by the phenol resin was formed on the metal magnetic particles.

$TiO_2$ was coated on powder E by a wet atomize. First, titanium propoxide was wet atomized, heat treated thereof at 900° C. for 10 h, and the coating part configured by $TiO_2$ was formed on the metal magnetic particles.

A raw material powder of powder F was oxidized at 950° C. for 1 h, and the coating part configured by a ferrite was formed on the metal magnetic particles.

The obtained powders A to F were mixed with a predetermined ratio, and the metal magnetic powders of Ex. 1-1 to 1-18 and Comp. Ex. 1-1 to 1-8 were obtained. A total amount of an epoxy resin as a thermosetting resin and an imide resin as a curing agent was set to be 4 mass %, with respect to 100 wt % of the obtained metal magnetic powder, and added acetone to be a solution. Then the solution was mixed with the metal magnetic powder. After the mixture, the grain obtained by evaporating the acetone was grain-regulated with 355 μm mesh. The grain-regulated powder was filled in a mold of a toroidal shape, having an outer diameter of 17.5 mm and an inner diameter of 11.0 mm, pressured by a mold pressure of 980 MPa, and the molded body of the dust core was obtained. The molded body weight was 5 g. The molded body of the manufactured dust core was subjected to the thermosetting treatment at 200° C. for 5 hours in an atmosphere, and the dust core of Ex. 1-1 to 1-18 and Comp. Ex. 1-1 to 1-8 were obtained.

Subsequently, the metal magnetic particles configuring the obtained dust core and the corrosion-resistance of the dust core were evaluated. The evaluation of the metal magnetic particles were performed by evaluating the particle size distribution of the metal magnetic particles inside the dust core, a number percentage of the metal magnetic particles to which the coating part is formed, a number percentage of the particles coated with the inorganic compound including the alkaline earth metals, Mg, Ca and Ba, among the particles having a particle diameter of 10.0 μm or less and 5.0 μm or less, and a relation of the total amount of the metal element in the coating part and the amount of the alkaline earth metals Mg, Ca and Ba.

The particle size distribution of the metal magnetic particles inside the dust core was evaluated by the method described below. First, the dust core was cut, grinded, and the cross section thereof was exposed. The cross section was observed by SEM and a view field of 1 mm×1 mm was image photographed. The obtained image was analyzed and the areas of the particles included in the image were calculated. Then, a particle diameter was calculated from said areas. The cumulative frequency of the obtained particle diameter was added up from the particle diameter of smaller size. From the processes, a 10% particle number of the total number was determined d10. Similarly, the 50% particle number was determined d50 (an average particle diameter), and the 90% particle number was d90. Results are shown in Table 1.

A number percentage of the metal magnetic particles to which the coating part is formed, a number percentage of the particles coated with the inorganic compound including the alkaline earth metals, Mg, Ca and Ba, among the particles having a particle diameter of 10.0 μm or less and 5.0 μm or less, and a relation of the total amount of the metal element in the coating part and the amount of the alkaline earth metals Mg, Ca and Ba were evaluated by the following method.

A view field of 1 mm×1 mm in the image obtained by measuring the above particle distribution was subjected to EDS mapping. From the compositional mapping image of the obtained metal magnetic particles, the particles to which the coating part is formed was distinguished, and materials included in the coating part were specified. The ratio of the number of said particles and the number of all the particles present in the image was calculated. In addition, the number percentage of the particles, in which materials included in the coating part is the inorganic compound including the alkaline earth metal, among particles having particle diameters of 10.0 μm or less and 5.0 μm or less, calculated by an evaluation of the particle size distribution mentioned above. In addition, quantitative analysis of the element in the coating part was performed, and a ratio of the alkaline earth metal with respect to the total amount of the metals was calculated. Results are shown in Table 1.

The corrosion-resistance was evaluated as mentioned below. First, 5% sodium chloride solution was atomized to the molded body of the manufactured dust core, and tested thereof by holding at 35° C. for 24 hours. The tested dust core was washed with an ion exchange water, dried thereof, the rusting situation was observed by an optical microscope of 50 magnifications, and the area ratio occupied by the rust in a visual field of 3 mm×3 mm was calculated. The measurement point was determined 10 points per one sample, and the average area ratio of the rust was calculated. Results are shown in Table 1.

Note, "a number percentage of the coated particles" in Table 1 is shown distinguishing the number percentage of the metal magnetic particles coated by the inorganic compound including the alkaline earth metal and the same of the metal magnetic particles coated by the other materials. Further, in Table 1, "an alkaline earth metal of 10 μm or less" shows the number percentage of the particles coated by the inorganic compound including the alkaline earth metal among the particles having the particle diameter of 10.0 μm or less, and "an alkaline earth metal of 5 μm or less" shows the number percentage of the particles coated by the inorganic compound including the alkaline earth metal among the particles having the particle diameter of 5.0 μm or less. It is the same in Tables 2 to 5 mentioned below.

Further, in Table 1, the corrosion-resistance is determined low when the area ratio occupied by the rust exceeded 15%. While it is determined to have the corrosion-resistance when the area ratio is 15% or less, it is preferable when 10% or less, it is more preferable when 7.5% or less, and it is particularly preferable when 5.0% or less. It is the same in Tables 2 to 5 mentioned below.

number percentage of the metal magnetic particles coated with the inorganic compound including the alkaline earth metal is within the above range. While it was confirmed that the area ratio of the rust became large and the corrosion-resistance was insufficient when said number percentage is without the above range. In addition, it was confirmed that the area ratio of the rust became large and the corrosion-resistance was insufficient when the metal magnetic particles are coated with the compound other than the inorganic compound including the alkaline earth metal.

Example 2

The dust core was manufactured similarly to the same of Ex. 1, except forming the coating part on the metal magnetic particles of particle B-1 using the inorganic compound, in which the content ratios of MgO and $Al_2O_3$ were varied, and then varying the particle size distributions of powder A and powder B-1 by screening powder A and powder B-1. The same evaluation as in Ex. 1 was performed. Results are shown in Table 2.

TABLE 1

| | Particle size distribution in dust core [μm] | | | Number percentage of Coated particles [%] | | | | Coated Part | | Rust area ratio [%] |
| | | | | Alkaline earth metal | Others | Alkaline earth metal (10.0 μm or less) | Alkaline earth metal (5.0 μm or less) | Content materials | Alkaline earth metal amount [mass %] | |
| Ex. | d10 | d50 | d90 | | | | | | | |
|---|---|---|---|---|---|---|---|---|---|---|
| Comp. Ex. 1-1 | 3.5 | 18.2 | 38.5 | 0 | 0 | 42.2 | 51.1 | — | — | 41.4 |
| Comp. Ex. 1-2 | 2.9 | 18.1 | 38.2 | 2.5 | 0 | 42.2 | 51.1 | MgO + $Al_2O_3$ | 10.6 | 37.5 |
| Comp. Ex. 1-3 | 2.7 | 17.9 | 39.1 | 4.6 | 0 | 42.1 | 51.0 | MgO + $Al_2O_3$ | 11.4 | 32.4 |
| Comp. Ex. 1-4 | 2.3 | 17.2 | 39.1 | 4.8 | 0 | 41.9 | 50.9 | MgO + $Al_2O_3$ | 10.5 | 27.5 |
| Comp. Ex. 1-1 | 2.8 | 16.7 | 39.7 | 5.2 | 0 | 41.8 | 50.7 | MgO + $Al_2O_3$ | 10.2 | 14.7 |
| Ex. 1-2 | 2.9 | 16.6 | 40.5 | 5.5 | 0 | 41.7 | 50.7 | MgO + $Al_2O_3$ | 11.0 | 13.5 |
| Ex. 1-3 | 3.1 | 16.3 | 41.2 | 10.0 | 0 | 41.6 | 50.6 | MgO + $Al_2O_3$ | 10.9 | 12.7 |
| Ex. 1-4 | 2.8 | 18.1 | 42.2 | 15.6 | 0 | 41.8 | 50.8 | MgO + $Al_2O_3$ | 11.2 | 14.7 |
| Ex. 1-5 | 3.2 | 18.4 | 39.1 | 25.0 | 0 | 42.2 | 51.0 | MgO + $Al_2O_3$ | 10.3 | 13.1 |
| Ex. 1-6 | 3.1 | 19.1 | 38.9 | 27.9 | 0 | 42.4 | 51.2 | MgO + $Al_2O_3$ | 10.1 | 13 |
| Ex. 1-7 | 3.5 | 18.2 | 39.9 | 32.1 | 0 | 42.1 | 50.9 | MgO + $Al_2O_3$ | 12.1 | 12.8 |
| Ex. 1-8 | 1.9 | 17.8 | 39.8 | 39.8 | 0 | 42.2 | 51.1 | MgO + $Al_2O_3$ | 10.4 | 12.9 |
| Ex. 1-9 | 3.1 | 17.5 | 38.8 | 40.2 | 0 | 42.0 | 50.9 | MgO + $Al_2O_3$ | 10.5 | 12.5 |
| Ex. 1-10 | 3.4 | 18.7 | 37.6 | 61.5 | 0 | 42.5 | 51.2 | MgO + $Al_2O_3$ | 11.4 | 12.6 |
| Ex. 1-11 | 3.1 | 19.1 | 37.3 | 82.1 | 0 | 42.6 | 51.3 | MgO + $Al_2O_3$ | 10.2 | 12.6 |
| Ex. 1-12 | 2.9 | 18.5 | 36.5 | 99.5 | 0 | 42.6 | 51.3 | MgO + $Al_2O_3$ | 10.4 | 12.5 |
| Ex. 1-13 | 2.9 | 18.8 | 40.1 | 5.1 | 0 | 42.2 | 51.0 | BaO + $Al_2O_3$ | 11.4 | 14.1 |
| Ex. 1-14 | 3.1 | 18.5 | 43.5 | 10.4 | 0 | 41.8 | 50.8 | BaO + $Al_2O_3$ | 10.5 | 12.4 |
| Ex. 1-15 | 2.9 | 19.3 | 42.1 | 24.8 | 0 | 42.1 | 51.0 | BaO + $Al_2O_3$ | 11.2 | 13.4 |
| Ex. 1-16 | 3.2 | 19.1 | 42.1 | 4.8 | 0 | 42.1 | 50.9 | CaO + $Al_2O_3$ | 11.5 | 14.4 |
| Ex. 1-17 | 3.4 | 19.2 | 44.5 | 9.1 | 0 | 41.9 | 50.8 | CaO + $Al_2O_3$ | 11.8 | 12.3 |
| Ex. 1-18 | 3.6 | 18.7 | 47.8 | 25.2 | 0 | 41.5 | 50.6 | CaO + $Al_2O_3$ | 10.4 | 13.7 |
| Comp. Ex. 1-5 | 3.2 | 18.4 | 37.7 | 0 | 40.1 | — | — | Phosphate | — | 42.5 |
| Comp. Ex. 1-6 | 2.5 | 18.2 | 39.1 | 0 | 40.3 | — | — | Phenol resin | — | 43.1 |
| Comp. Ex. 1-7 | 1.9 | 18.3 | 39.3 | 0 | 39.7 | — | — | $TiO_2$ | — | 44.5 |
| Comp. Ex. 1-8 | 2.5 | 18.2 | 40.1 | 0 | 42.1 | — | — | Ferrite | — | 47.5 |

From Table 1, it was confirmed that the area ratio of the rust is small and shows good corrosion-resistance when the

TABLE 2

| | Particle size distribution in dust core [μm] | | | Number percentage of Coated particles [%] | | | | Coated Part | | Rust area ratio [%] |
| | | | | Alkaline earth metal | Others | Alkaline earth metal (10.0 μm or less) | Alkaline earth metal (5.0 μm or less) | Content materials | Alkaline earth metal amount [mass %] | |
| Ex. | d10 | d50 | d90 | | | | | | | |
|---|---|---|---|---|---|---|---|---|---|---|
| Comp. Ex. 2-1 | 3.5 | 19.7 | 40.5 | 15.6 | 0 | 42.4 | 51.2 | MgO + $Al_2O_3$ | 8.5 | 23.1 |
| Comp. Ex. 2-2 | 3.2 | 19.6 | 39.1 | 14.9 | 0 | 42.5 | 51.3 | MgO + $Al_2O_3$ | 9.5 | 22.1 |
| Ex. 2-1 | 4.1 | 19.5 | 39.9 | 15.1 | 0 | 42.4 | 51.2 | MgO + $Al_2O_3$ | 10.3 | 12.4 |
| Ex. 2-2 | 3.1 | 19.4 | 39.3 | 15.5 | 0 | 42.4 | 51.2 | MgO + $Al_2O_3$ | 11.2 | 11.5 |
| Ex. 2-3 | 3.1 | 19.6 | 38.9 | 15.7 | 0 | 42.5 | 51.3 | MgO + $Al_2O_3$ | 19.1 | 11.2 |
| Ex. 2-4 | 2.6 | 19.2 | 38.2 | 16.1 | 0 | 42.5 | 51.3 | MgO + $Al_2O_3$ | 27.7 | 10.7 |

TABLE 2-continued

|  | Particle size distribution in dust core [μm] | | | Number percentage of Coated particles [%] | | | | Coated Part | | Rust area ratio [%] |
|---|---|---|---|---|---|---|---|---|---|---|
|  | | | | Alkaline earth metal | Others | Alkaline earth metal (10.0 μm or less) | Alkaline earth metal (5.0 μm or less) | Content materials | Alkaline earth metal amount [mass %] | |
| Ex. | d10 | d50 | d90 | | | | | | | |
| Ex. 2-5 | 1.9 | 18.8 | 38.9 | 15.1 | 0 | 42.3 | 51.1 | MgO + Al$_2$O$_3$ | 47.5 | 10.4 |
| Ex. 2-6 | 1.9 | 18.4 | 38.5 | 14.9 | 0 | 42.3 | 51.1 | MgO + Al$_2$O$_3$ | 63.2 | 10.2 |
| Ex. 2-7 | 3.2 | 16.3 | 38.1 | 15.5 | 0 | 41.8 | 50.8 | MgO + Al$_2$O$_3$ | 71.2 | 10.1 |
| Ex. 2-8 | 2.1 | 16.7 | 39.7 | 16.1 | 0 | 41.8 | 50.7 | MgO + Al$_2$O$_3$ | 88.9 | 10.0 |
| Ex. 2-9 | 2.5 | 16.5 | 39.7 | 16.2 | 0 | 41.7 | 50.7 | MgO | 99.4 | 10.5 |
| Ex. 2-10 | 13.4 | 60.1 | 80.5 | 15.9 | 0 | 45.6 | 54.2 | MgO + Al$_2$O$_3$ | 11.4 | 11.9 |
| Comp. Ex. 2-11 | 19.5 | 99.5 | 118.5 | 15.8 | 0 | 47.1 | 55.9 | MgO + Al$_2$O$_3$ | 11.5 | 11.4 |
| Comp. Ex. 2-12 | 20.3 | 120.2 | 165.3 | 14.9 | 0 | 45.3 | 53.8 | MgO + Al$_2$O$_3$ | 12.3 | 12.1 |
| Comp. Ex. 2-13 | 24.9 | 150.5 | 188.2 | 15.1 | 0 | 46.4 | 55.1 | MgO + Al$_2$O$_3$ | 12.1 | 12.3 |

From Table 2, it was confirmed that the area ratio of the rust becomes large and the corrosion-resistance is insufficient when Mg included in the coating part is comparatively high concentrated, even when the number percentage of the metal magnetic particles to which the inorganic compound including Mg as the alkaline earth metal are within the above range. In addition, it was confirmed that the area ratio of the rust is small and shows a good corrosion-resistance, when the number percentage of the metal magnetic particles to which the inorganic compound including Mg is coated and the percentage of Mg included in the coating part are within the above range, even when the particle size distribution of the metal magnetic particles configuring the dust core is varied.

Example 3

As the metal magnetic powder, powder G having approx. 5 μm of d99 according to the metal magnetic particles and powder H having approx. 10 μm of d99 according to the metal magnetic particles, respectively made of Fe were prepared. As the metal magnetic powder, powders G and H, made of Fe, and the metal magnetic particles thereof showing d99 of approx. 5 μm and approx. 10 μm respectively were prepared. The inorganic compound including MgO was coated on Powders G and H by the coating treatment of the wet method. First, ionic crystals of Mg source was dissolved in acetone, each powder was added to the acetone, and mixed thereof to make a slurry. The obtained slurry was evaporated and dried, the dried powder was heat treated at 600° C. for 10 hours, and then the coating part composed of the inorganic compound including MgO was formed on Powder G and Powder H. The coated powders were suitably mixed with Powder C. From the processes, the metal magnetic powder in which the number percentage of the metal magnetic particles coated with the inorganic compound including the alkaline earth metal among the metal magnetic particles having the particle diameter of 10.0 μm or less is 40 to 90%, and the number percentage of the metal magnetic particles coated with the inorganic compound including the alkaline earth metal among the metal magnetic particles having the particle diameter of 5.0 μm or less is 50 to 99% was obtained.

Figure 2:
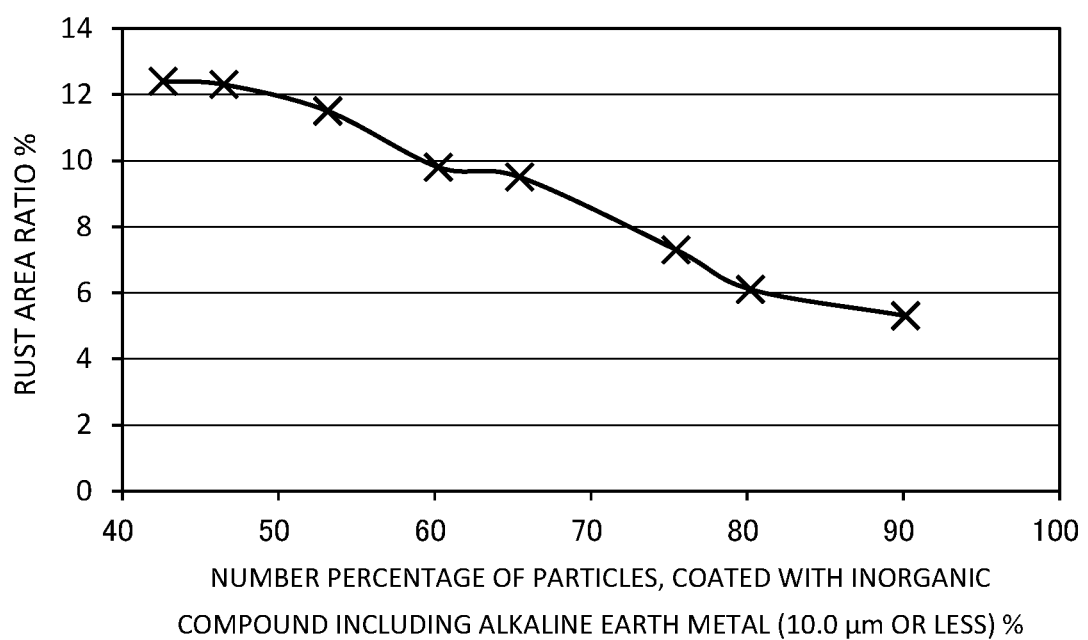
FIG. 2 is a graph showing a relation of a number percentage of particles, coated with the inorganic compound including the alkaline earth metal among the metal magnetic particles having a particle diameter of 10.0 μm or less, and a rust area ratio of the dust core, according to the examples.
Figure 3:
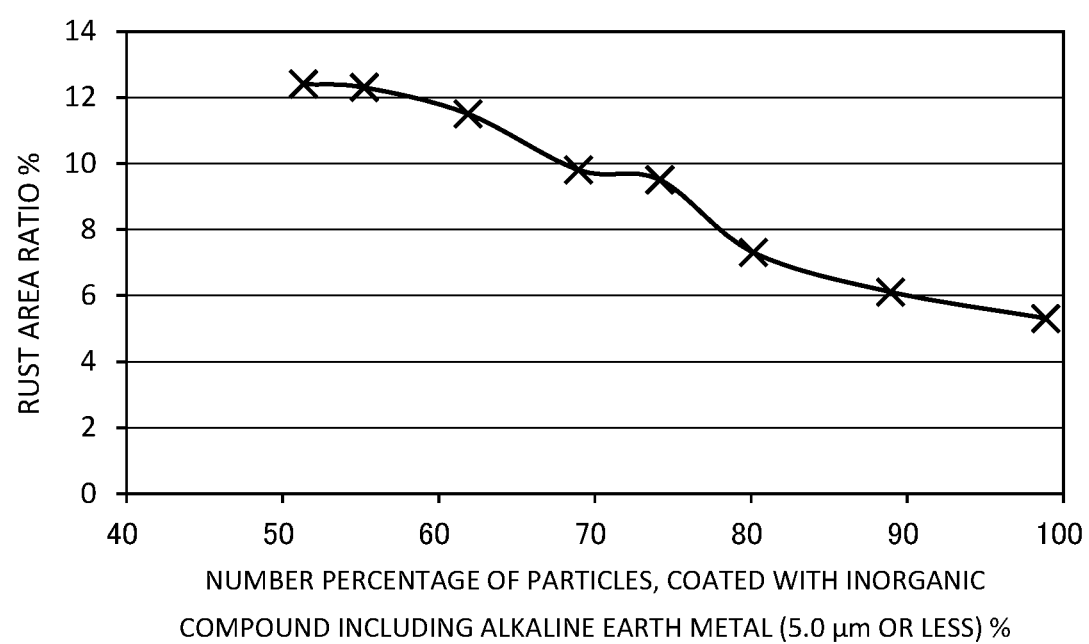
FIG. 3 is a graph showing a relation of a number percentage of particles, coated with the inorganic compound including the alkaline earth metal among the metal magnetic particles having a particle diameter of 5.0 μm or less, and a rust area ratio of the dust core, according to the examples.

Using the obtained metal magnetic powder, the dust core was manufactured similarly to the same of Ex. 1, and the same evaluation as in Ex. 1 was performed. Results are shown in Table 3. FIG. 2 is a graph showing a relation between the number percentage of particles coated with the inorganic compound including the alkaline earth metal among particles having a particle diameter of 10.0 μm or less and the area ratio of the rust. FIG. 3 is a graph showing a relation between the number percentage of particles coated with the inorganic compound including the alkaline earth metal among particles having a particle diameter of 5.0 μm or less and the area ratio of the rust.

TABLE 3

|  | Particle size distribution in dust core [μm] | | | Number percentage of Coated particles [%] | | | | Coated Part | | Rust area ratio [%] |
|---|---|---|---|---|---|---|---|---|---|---|
|  | | | | Alkaline earth metal | Others | Alkaline earth metal (10.0 μm or less) | Alkaline earth metal (5.0 μm or less) | Content materials | Alkaline earth metal amount [mass %] | |
| Ex. | d10 | d50 | d90 | | | | | | | |
| Ex. 3-1 | 3.2 | 20.4 | 39.9 | 15.5 | 0 | 42.6 | 51.3 | MgO + Al$_2$O$_3$ | 10.5 | 12.4 |
| Ex. 3-2 | 3.5 | 19.4 | 40.2 | 15.7 | 0 | 46.5 | 55.2 | MgO + Al$_2$O$_3$ | 10.6 | 12.3 |
| Ex. 3-3 | 3.4 | 19.3 | 39.4 | 15.3 | 0 | 53.2 | 61.9 | MgO + Al$_2$O$_3$ | 10.1 | 11.5 |
| Ex. 3-4 | 3.1 | 19.1 | 37.5 | 15.2 | 0 | 60.2 | 69.0 | MgO + Al$_2$O$_3$ | 10.5 | 9.8 |
| Ex. 3-5 | 3.9 | 20.1 | 38.5 | 15.7 | 0 | 65.4 | 74.2 | MgO + Al$_2$O$_3$ | 10.3 | 9.5 |
| Ex. 3-6 | 3.5 | 20.3 | 37.5 | 15.4 | 0 | 75.4 | 80.1 | MgO + Al$_2$O$_3$ | 10.6 | 7.3 |
| Ex. 3-7 | 3.5 | 21.1 | 40.1 | 15.6 | 0 | 80.2 | 88.9 | MgO + Al$_2$O$_3$ | 10.4 | 6.1 |
| Ex. 3-8 | 3.1 | 20.5 | 39.9 | 15.5 | 0 | 90.1 | 98.9 | MgO + Al$_2$O$_3$ | 10.1 | 5.3 |

From Table 3 and FIG. 2, it was confirmed that a good corrosion-resistance can be obtained when the number percentage of the metal magnetic particles coated with the inorganic compound including the alkaline earth metal among the metal magnetic particles having the particle diameter of 10.0 μm or less in the metal magnetic powder is 60% or more. Further, from Table 3 and FIG. 3, it was confirmed that a further good corrosion-resistance can be obtained when the number percentage of the metal magnetic particles coated with the inorganic compound including the alkaline earth metal among the metal magnetic particles having the particle diameter of 5.0 μm or less in the metal magnetic powder is 80% or more.

Example 4

As the metal magnetic powder, powder I having approx. 2 μm of d99 according to said metal magnetic particle, powder J having approx. 5 μm of d99 according to said metal magnetic particle, powder K having approx. 11 μm of d99 according to said metal magnetic particle, powder L having approx. 20 μm of d99 according to said metal magnetic particle, powder M having approx. 25 μm of d99 according to said metal magnetic particle, powder N having approx. 35 μm of d99 according to said metal magnetic particle, powder O having approx. 50 μm of d99 according to said metal magnetic particle, were prepared. The inorganic compound including MgO was coated on Powders I to O by the coating treatment of the wet method. First, ionic crystals of Mg source was dissolved in acetone, each powder was added to the acetone, and mixed thereof to make slurry. The obtained slurry was evaporated and dried, the dried powder was heat treated at 600° C. for 10 hours, and then the coating part composed of the inorganic compound including MgO was formed on Powders I to O. The coated powders were suitably mixed with Powder C. From the processes, the metal magnetic powder in which the number percentage of the metal magnetic particles surface-coated with the inorganic compound including MgO among the metal magnetic particles having the particle diameter of 25.0 μm or more is 0 to 95%, and the remaining metal magnetic particles are coated with nickel phosphate, was obtained.

In addition, the metal magnetic powders, in which Powder C and MgO particles are mixed, were obtained by adding and mixing 1.0 wt %, 5.0 wt % or 10.0 w % MgO particles, having an average particle diameter of 1 μm to Powder C.

Using the obtained metal magnetic powder, the dust core was manufactured similarly to the same of Ex. 1, and the same evaluation as in Ex. 2 was performed. In addition, the number percentage of the metal magnetic particles coated with the inorganic compound including the alkaline earth metal among the particles having a particle diameter of 25.0 μm or more was calculated, and Sc and Sm were measured.

The number percentage of the metal magnetic particles coated with the inorganic compound including the alkaline earth metal among the particles having a particle diameter of 25.0 μm or more was calculated similarly to the same of Ex. 1.

Sc and Sm were obtained by a TEM-EDS observation with respect to arbitrary metal magnetic particles coated with the inorganic compound including the alkaline earth metal. The area Sm of the magnetic metal and the area Sc of the coating part (the inorganic compound including Mg only) were calculated, and their ratio Sc/Sm was calculated. Results are shown in Table 4.

Note, "alkaline earth metal of 25.0 μm or more" in Table 4 shows the number percentage of the particles coated with the inorganic compound including the alkaline earth metal, among the particles having the particle diameter of 25.0 μm or more. It is the same in Table 5 mentioned below.

The initial permeabililty in addition to its area ratio of the rust according to the obtained dust core, was further measured. The initial permeabililty was measured by LCR meter (LCR428A made by HP Co.) by setting the winding number of the wire on the dust core to 50 turns. Results are shown in Table 4.

Figure 4:
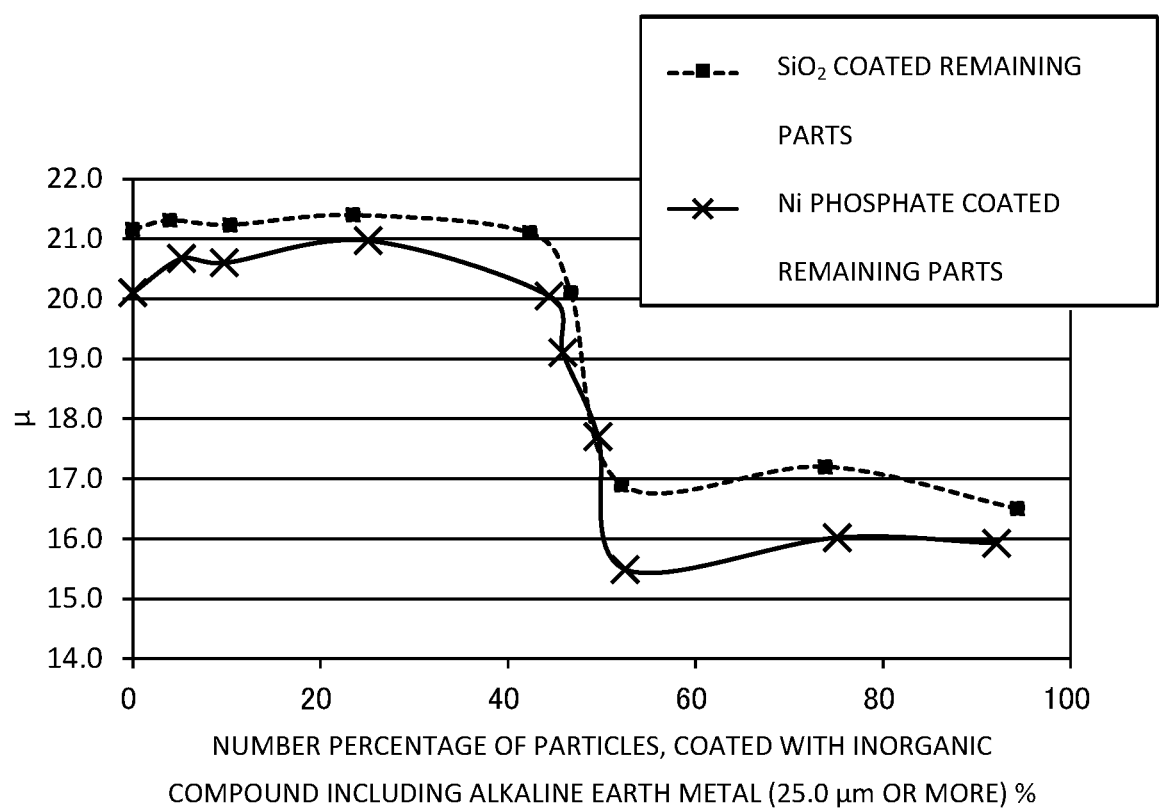
FIG. 4 is a graph showing a relation of a number percentage of particles, coated with the inorganic compound including the alkaline earth metal, among the metal magnetic particles having a particle diameter of 25.0 μm or more, and an initial permeability of the dust core, according to the examples.

In addition, FIG. 4 shows a graph showing a relation between the number percentage of particles coated with the inorganic compound including the alkaline earth metal among particles having the particle diameter of 25.0 μm or more and the initial permeability of the dust core.

TABLE 4

| Ex. | Particle size distribution in dust core [μm] | | | Method of including alkaline earth metal | Number percentage of Coated particles [%] | | | | |
|---|---|---|---|---|---|---|---|---|---|
| | d10 | d50 | d90 | | Alkaline earth metal | Others | Alkaline earth metal (25.0 μm or less) | Alkaline earth metal (10.0 μm or less) | Alkaline earth metal (5.0 μm or less) |
| Comp. Ex. 4-1 | 2.8 | 17.1 | 39.8 | 1.0 wt % added | 0 | 100.0 | 0.0 | 0.0 | 0.0 |
| Comp. Ex. 4-2 | 2.7 | 17.2 | 38.5 | 5.0 wt % added | 0 | 100.0 | 0.0 | 0.0 | 0.0 |
| Comp. Ex. 4-3 | 2.5 | 16.4 | 42.1 | 10.0 wt % added | 0 | 100.0 | 0.0 | 0.0 | 0.0 |
| Comp. Ex. 4-4 | 2.5 | 16.6 | 41.5 | — | 0 | 100.0 | 0.0 | 0.0 | 0.0 |
| Ex. 4-1 | 3.5 | 17.1 | 39.6 | Coat | 46.8 | 53.2 | 5.2 | 44.2 | 50.9 |
| Ex. 4-2 | 3.1 | 17.1 | 39.9 | Coat | 48.2 | 51.8 | 9.8 | 43.3 | 50.6 |
| Ex. 4-3 | 3.4 | 16.9 | 39.7 | Coat | 56.6 | 43.4 | 25.1 | 44.0 | 50.8 |
| Ex. 4-4 | 4.1 | 16.7 | 39.8 | Coat | 68.2 | 31.8 | 44.4 | 46.0 | 51.5 |
| Ex. 4-5 | 3.4 | 15.7 | 39.5 | Coat | 67.6 | 32.4 | 45.9 | 44.7 | 51.0 |
| Ex. 4-6 | 2.9 | 16.1 | 39.1 | Coat | 68.0 | 32.0 | 49.6 | 43.2 | 50.6 |
| Ex. 4-7 | 2.8 | 16.2 | 37.3 | Coat | 69.2 | 30.8 | 52.5 | 43.0 | 50.5 |
| Ex. 4-8 | 2.5 | 16.6 | 37.1 | Coat | 79.8 | 20.2 | 75.1 | 42.3 | 50.3 |
| Ex. 4-9 | 2.5 | 17.0 | 39.1 | Coat | 88.2 | 11.8 | 92.1 | 42.2 | 50.3 |
| Ex. 4-10 | 2.7 | 17.2 | 39.6 | Coat | 54.5 | 45.5 | 24.1 | 42.5 | 50.4 |
| Ex. 4-11 | 2.9 | 18.1 | 38.8 | Coat | 55.3 | 44.7 | 25.5 | 42.6 | 50.4 |
| Ex. 4-12 | 3.1 | 16.3 | 39.2 | Coat | 56.0 | 44.0 | 24.8 | 43.6 | 50.7 |
| Ex. 4-13 | 3.2 | 15.9 | 39.2 | Coat | 56.6 | 43.4 | 25.0 | 44.1 | 50.8 |
| Ex. 4-14 | 2.7 | 15.7 | 38.7 | Coat | 54.9 | 45.1 | 24.0 | 43.0 | 50.5 |
| Ex. 4-15 | 2.6 | 15.7 | 38.6 | Coat | 53.9 | 46.1 | 22.4 | 42.7 | 50.5 |
| Ex. 4-16 | 2.8 | 16.1 | 38.5 | Coat | 55.4 | 44.6 | 24.7 | 43.0 | 50.5 |
| Ex. 4-17 | 2.8 | 16.7 | 39.1 | Coat | 55.4 | 44.6 | 25.1 | 42.8 | 50.5 |
| Ex. 4-18 | 2.9 | 14.9 | 39.1 | Coat | 56.2 | 43.8 | 24.9 | 43.8 | 50.7 |
| Ex. 4-19 | 2.7 | 15.1 | 39.6 | Coat | 55.3 | 44.7 | 24.2 | 43.2 | 50.6 |
| Ex. 4-20 | 2.4 | 15.3 | 40.1 | Coat | 55.3 | 44.7 | 25.7 | 42.5 | 50.4 |
| Ex. 4-21 | 2.5 | 15.7 | 40.5 | Coat | 54.2 | 45.8 | 23.4 | 42.5 | 50.4 |
| Ex. 4-22 | 2.1 | 16.1 | 40.2 | Coat | 53.4 | 46.6 | 23.5 | 41.7 | 50.2 |
| Ex. 4-23 | 2.2 | 16.2 | 39.9 | Coat | 53.5 | 46.5 | 23.3 | 41.8 | 50.3 |
| Ex. 4-24 | 2.0 | 15.5 | 37.9 | Coat | 54.3 | 45.7 | 25.2 | 41.7 | 50.2 |

TABLE 4-continued

| Ex. | | | | | | | | | |
|---|---|---|---|---|---|---|---|---|---|
| Ex. 4-25 | 2.0 | 15.1 | 38.1 | Coat | 53.6 | 46.4 | 23.7 | 41.8 | 50.2 |
| Ex. 4-26 | 2.3 | 15.2 | 38.7 | Coat | 54.4 | 45.6 | 24.1 | 42.3 | 50.3 |
| Ex. 4-27 | 2.1 | 15.4 | 38.2 | Coat | 53.9 | 46.1 | 24.1 | 41.9 | 50.3 |
| Ex. 4-28 | 2.2 | 15.7 | 39.1 | Coat | 54.1 | 45.9 | 24.3 | 42.0 | 50.3 |
| Ex. 4-29 | 3.1 | 16.2 | 39.5 | Coat | 56.3 | 43.7 | 25.3 | 43.7 | 50.7 |
| Ex. 4-30 | 3.2 | 16.1 | 39.6 | Coat | 55.9 | 44.1 | 23.9 | 44.0 | 50.8 |
| Ex. 4-31 | 3.3 | 16.4 | 39.1 | Coat | 55.4 | 44.6 | 22.6 | 44.0 | 50.8 |

| | Alkaline earth metal included coating part | | | Alkaline earth metal none included coating part | | | |
|---|---|---|---|---|---|---|---|
| Ex. | Content materials | Alkaline earth metal amount [mass %] | Sc/Sm | Content materials | Density [g/cm³] | μ | Rust area ratio [%] |
| Comp. Ex. 4-1 | — | 0 | — | Ni phosphate | 5.81 | 14.3 | 27.4 |
| Comp. Ex. 4-2 | — | 0 | — | Ni phosphate | 5.75 | 12.1 | 23.2 |
| Comp. Ex. 4-3 | — | 0 | — | Ni phosphate | 5.67 | 10.9 | 19.5 |
| Comp. Ex. 4-4 | — | 0 | — | Ni phosphate | 5.94 | 20.1 | 32.5 |
| Ex. 4-1 | MgO | 99.8 | 0.1045 | Ni phosphate | 5.98 | 20.7 | 9.8 |
| Ex. 4-2 | MgO | 99.8 | 0.1121 | Ni phosphate | 6.00 | 20.6 | 9.0 |
| Ex. 4-3 | MgO | 99.4 | 0.1233 | Ni phosphate | 6.01 | 21.0 | 7.3 |
| Ex. 4-4 | MgO | 99.9 | 0.1045 | Ni phosphate | 5.99 | 20.0 | 8.5 |
| Ex. 4-5 | MgO | 99.6 | 0.1011 | Ni phosphate | 5.97 | 19.1 | 8.7 |
| Ex. 4-6 | MgO | 99.4 | 0.1045 | Ni phosphate | 5.98 | 17.7 | 8.1 |
| Ex. 4-7 | MgO | 99.8 | 0.1056 | Ni phosphate | 5.95 | 15.5 | 7.9 |
| Ex. 4-8 | MgO | 98.9 | 0.1121 | Ni phosphate | 5.84 | 16.0 | 7.8 |
| Ex. 4-9 | MgO | 99.9 | 0.1156 | Ni phosphate | 5.85 | 15.9 | 7.6 |
| Ex. 4-10 | MgO | 99.2 | 0.0015 | Ni phosphate | 6.06 | 20.4 | 9.1 |
| Ex. 4-11 | MgO | 99.5 | 0.0029 | Ni phosphate | 6.07 | 20.5 | 8.1 |
| Ex. 4-12 | MgO | 99.4 | 0.0047 | Ni phosphate | 6.03 | 20.1 | 7.6 |
| Ex. 4-13 | MgO | 99.7 | 0.0051 | Ni phosphate | 6.05 | 20.9 | 7.4 |
| Ex. 4-14 | MgO | 99.8 | 0.0056 | Ni phosphate | 6.04 | 21.7 | 7.3 |
| Ex. 4-15 | MgO | 99.5 | 0.0059 | Ni phosphate | 6.05 | 21.5 | 7.1 |
| Ex. 4-16 | MgO | 99.1 | 0.0073 | Ni phosphate | 6.06 | 21.2 | 7.1 |
| Ex. 4-17 | MgO | 99.4 | 0.0146 | Ni phosphate | 6.06 | 21.0 | 7 |
| Ex. 4-18 | MgO | 99.1 | 0.0305 | Ni phosphate | 6.04 | 22.1 | 6.2 |
| Ex. 4-19 | MgO | 99.8 | 0.0363 | Ni phosphate | 5.96 | 22.4 | 6.1 |
| Ex. 4-20 | MgO | 99.7 | 0.0421 | Ni phosphate | 6.01 | 22.5 | 5.7 |
| Ex. 4-21 | MgO | 99.3 | 0.0435 | Ni phosphate | 6.01 | 22.3 | 5.4 |
| Ex. 4-22 | MgO | 99.4 | 0.0450 | Ni phosphate | 6.04 | 22.6 | 5.2 |
| Ex. 4-23 | MgO | 99.5 | 0.0464 | Ni phosphate | 6.02 | 22.1 | 5.1 |
| Ex. 4-24 | MgO | 99.6 | 0.0720 | Ni phosphate | 6.03 | 22.4 | 5.5 |
| Ex. 4-25 | MgO | 99.1 | 0.0861 | Ni phosphate | 6.01 | 21.3 | 5.2 |
| Ex. 4-26 | MgO | 99.2 | 0.0932 | Ni phosphate | 6.01 | 21.1 | 5.3 |
| Ex. 4-27 | MgO | 99.6 | 0.0974 | Ni phosphate | 6.02 | 20.4 | 5.1 |
| Ex. 4-28 | MgO | 99.7 | 0.0988 | Ni phosphate | 6.04 | 20.1 | 5.4 |
| Ex. 4-29 | MgO | 99.6 | 0.1002 | Ni phosphate | 5.98 | 18.7 | 5.1 |
| Ex. 4-30 | MgO | 99.4 | 0.1113 | Ni phosphate | 5.96 | 18.2 | 5.2 |
| Ex. 4-31 | MgO | 99.1 | 0.1141 | Ni phosphate | 5.98 | 17.8 | 5.1 |

From Table 4 and FIG. 4, it was confirmed that the initial permeability can be improved while showing a good corrosion-resistance and maintaining the area ratio of the rust small, when the number percentage of the metal magnetic particles, surface-coated with the inorganic compound including alkaline earth metal among the particles having the particle diameter of 25.0 μm or more is 50% or less, and the residual metal magnetic particles are coated with the insulating material. In addition, it was confirmed that the initial permeability can be improved while showing a good corrosion-resistance and maintaining the area ratio of the rust small, when Sc/Sm is within the above range.

Example 5

Powder P composing the metal magnetic particles of a Fe—Si based alloy and showing the particle size distribution similar to the same of Powders A to F was prepared, as the metal magnetic powder. The coating part was formed on the metal magnetic particles of Powder P by the method mentioned below.

$SiO_2$ was coated on Powder P by a wet atomizing treatment. First, an alkoxide silane solution was wet atomized to powder P. The coating part configured by $SiO_2$ was formed on the metal magnetic particles by heat treating the atomized powder P at 800° C. for 10 h.

The dust core was manufactured similarly to the same of Ex. 1, except for the following. Powder P, to which the coating part configured by $SiO_2$ is formed, was mixed with Powders I to O respectively. The metal magnetic powder, in which the metal magnetic particles are coated with the inorganic compound including Mg and have a maximum particle diameter of approx. 2 μm, approx. 5 μm, approx. 11 μm, approx. 20 μm, approx. 25 μm, approx. 35 μm, and approx. 50 μm, respectively, and the residual metal magnetic particles are coated with $SiO_2$, was used. Then, the manufactured dust cores were evaluated similarly to Ex. 4. Results are shown in Table 5. FIG. 4 is a graph showing a relation between the number percentage of particles coated with the inorganic compound including the alkaline earth metal among particles having the particle diameter of 25.0 μm or more and the initial permeability of the dust core.

In addition, the dust core was manufactured similarly to the same of Ex. 1, except the inorganic compound including Mg coating the surface of the metal magnetic particles configuring the dust core were the compounds shown in Table 5. Then, the manufactured dust cores were evaluated similarly to Ex. 4. Results are shown in Table 5.

TABLE 5

| | Particle size distribution in dust core [μm] | | | Method of including alkaline earth metal | Number percentage of Coated particles [%] | | | | |
|---|---|---|---|---|---|---|---|---|---|
| | | | | | Alkaline earth metal | Others | Alkaline earth metal (25.0 μm or less) | Alkaline earth metal (10.0 μm or les) | Alkaline earth metal (5.0 μm or less) |
| Ex. | d10 | d50 | d90 | | | | | | |
| Comp. Ex. 5-1 | 2.9 | 16.5 | 38.8 | Coat | 0 | 100.0 | 0.0 | 0.0 | 0.0 |
| Ex. 5-1 | 2.9 | 16.7 | 39.1 | Coat | 45.0 | 55.0 | 3.9 | 43.0 | 50.5 |
| Ex. 5-2 | 1.9 | 17.1 | 39.3 | Coat | 46.4 | 53.6 | 10.4 | 41.2 | 50.1 |
| Ex. 5-3 | 2.1 | 17.2 | 39.5 | Coat | 53.2 | 46.8 | 23.5 | 41.5 | 50.2 |
| Ex. 5-4 | 2.4 | 16.3 | 39.1 | Coat | 63.3 | 36.7 | 42.3 | 42.2 | 50.3 |
| Ex. 5-5 | 2.4 | 16.7 | 39.4 | Coat | 65.4 | 34.6 | 46.7 | 42.1 | 50.3 |
| Ex. 5-6 | 2.1 | 17.4 | 37.9 | Coat | 67.5 | 32.5 | 52.1 | 41.5 | 50.2 |
| Ex. 5-7 | 2.5 | 17.3 | 40.1 | Coat | 79.0 | 21.0 | 73.8 | 42.1 | 50.3 |
| Ex. 5-8 | 2.6 | 17.1 | 38.9 | Coat | 89.5 | 10.5 | 94.3 | 42.3 | 50.4 |
| Ex. 5-9 | 2.5 | 16.7 | 40.1 | Coat | 54.2 | 45.8 | 23.9 | 42.2 | 50.3 |
| Ex. 5-10 | 2.7 | 17.2 | 40.4 | Coat | 54.0 | 46.0 | 23.0 | 42.5 | 50.4 |
| Ex. 5-11 | 2.8 | 17.7 | 39.7 | Coat | 54.2 | 45.8 | 23.4 | 42.5 | 50.4 |
| Ex. 5-12 | 2.9 | 18.1 | 39.6 | Coat | 54.3 | 45.7 | 23.4 | 42.6 | 50.4 |
| Ex. 5-13 | 3.1 | 19.1 | 39.5 | Coat | 54.8 | 45.2 | 24.3 | 42.6 | 50.4 |

| | Alkaline earth metal included coating part | | | Alkaline earth metal none included | | | |
|---|---|---|---|---|---|---|---|
| Ex. | Content materials | Alkaline earth metal amount [mass %] | Sc/Sm | coating part Content materials | Density [g/cm³] | μ | Rust area ratio [%] |
| Comp. Ex. 5-1 | — | 0 | — | $SiO_2$ | 6.00 | 21.2 | 25 |
| Ex. 5-1 | MgO | 99.7 | 0.0151 | $SiO_2$ | 6.04 | 21.3 | 4.9 |
| Ex. 5-2 | MgO | 99.8 | 0.0152 | $SiO_2$ | 6.03 | 21.2 | 3.2 |
| Ex. 5-3 | MgO | 99.4 | 0.0149 | $SiO_2$ | 6.06 | 21.4 | 0.9 |
| Ex. 5-4 | MgO | 99.3 | 0.0167 | $SiO_2$ | 6.02 | 21.1 | 1.3 |
| Ex. 5-5 | MgO | 99.6 | 0.0145 | $SiO_2$ | 5.90 | 20.1 | 1.5 |
| Ex. 5-6 | MgO | 99.1 | 0.0176 | $SiO_2$ | 5.89 | 16.9 | 1.4 |
| Ex. 5-7 | MgO | 98.9 | 0.0134 | $SiO_2$ | 5.90 | 17.2 | 1.6 |
| Ex. 5-8 | MgO | 99.9 | 0.0156 | $SiO_2$ | 5.89 | 16.5 | 1.8 |
| Ex. 5-9 | $Mg(OH)_2$ | 99.4 | 0.0144 | $SiO_2$ | 6.02 | 20.9 | 1.5 |
| Ex. 5-10 | $MgCO_3$ | 99.4 | 0.0150 | $SiO_2$ | 6.01 | 20.5 | 1.8 |
| Ex. 5-11 | $Mg_4Al_2(OH)_{12}CO_3$ | 69.7 | 0.0152 | $SiO_2$ | 6.06 | 20.1 | 1.7 |
| Ex. 5-12 | MgCl | 98.5 | 0.0138 | $SiO_2$ | 6.04 | 21.1 | 1.3 |
| Ex. 5-13 | $MgSiO_3$ | 48.1 | 0.0144 | $SiO_2$ | 6.03 | 20.8 | 1.4 |

From Table 4 and FIG. 4, even when the insulating material was varied, it was confirmed that the initial permeability can be improved while showing a good corrosion-resistance and maintaining the area ratio of the rust small, when the number percentage of the metal magnetic particles, surface-coated with the inorganic compound including alkaline earth metal among the particles having the particle diameter of 25.0 μm or more is 50% or less, and the residual metal magnetic particles are coated with the insulating material. Tables 4 and 5 further show that the area ratio of the rust can be made small when oxides including Si were selected as the insulating material coating the metal magnetic particles. Thus, it was confirmed that the oxides including Si was preferable as the insulating material coating the metal magnetic particles.

Further, it was confirmed that the same effects can be obtained when the inorganic compound including Mg is a compound other than MgO.

The invention claimed is:

1. A dust core comprising a metal magnetic powder and a resin, wherein
    the metal magnetic powder shows a particle diameter of more than 0 μm and 200 μm or less,
    when d10 is a 10% particle diameter from smaller size in a cumulative particle size distribution of the metal magnetic powder, d10 is 1.9 μm or more and 24.9 μm or less,
    a number percentage of metal magnetic particles at least partially surface-coated with an inorganic compound including an alkaline earth metal is 5.0% or more among all of metal magnetic particles in the metal magnetic powder,
    in a coating part coating the metal magnetic particles, an amount of the alkaline earth metal is 10.0 mass% or more, when a total amount of a metal element included in the coating part is 100 mass%,
    each of the metal magnetic particles at least partially surface-coated has the coating part, and
    the metal magnetic powder includes metal magnetic particles having a particle diameter of 25.0 μm or more,
    a number percentage of metal magnetic particles having a particle diameter of 25.0 μm or more and coated with the inorganic compound including the alkaline earth metal is 50.0% or less among the metal magnetic particles having a particle diameter of 25.0 μm or more in the metal magnetic powder.

2. The dust core according to claim 1, wherein the alkaline earth metal is Mg.

3. The dust core according to claim 1, wherein the metal magnetic powder includes metal magnetic particles having a particle diameter of 10.0 μm or less, a number percentage of metal magnetic particles having a particle diameter of 10.0 μm or less and coated with the inorganic compound including the alkaline earth metal is 60.0% or more among the metal magnetic particles having a particle diameter of 10.0 μm or less in the metal magnetic powder.

4. The dust core according to claim 1, wherein the metal magnetic powder includes metal magnetic particles having a particle diameter of 5.0 μm or less, a number percentage of the metal magnetic particles having a particle diameter of 5.0 μm or less and coated with the inorganic compound including the alkaline earth metal is 80.0% or more among the metal magnetic particles having a particle diameter of 5.0 μm or less in the metal magnetic powder.

5. The dust core according to claim 1, wherein the metal magnetic particles coated with the inorganic compound including the alkaline earth metal show $$0.0050 < Sc/Sm < 0.1000$$

when

Sm is a cross-sectional area of the metal magnetic particles, and

Sc is a cross-sectional area of a part where the metal magnetic particles are coated with the inorganic compound including the alkaline earth metal.

6. The dust core according to claim 1, wherein among all of the metal magnetic particles in the metal magnetic powder, the metal magnetic particles, other than the metal magnetic particles coated with the inorganic compound including the alkaline earth metal, are at least partially surface-coated with an insulating material except for the inorganic compound including the alkaline earth metal.

7. The dust core according to claim 6, wherein the insulating material is an oxide including Si.

8. The dust core according to claim 1, wherein the metal magnetic particles composing the metal magnetic powder include Fe or Fe and Si.

9. The dust core according to claim 1, wherein the number percentage of metal magnetic particles that are at least partially surface-coated with an inorganic compound including an alkaline earth metal is 7.5% or more among all of the metal magnetic particles in the metal magnetic powder.

10. The dust core according to claim 1, wherein the number percentage of metal magnetic particles that are at least partially surface-coated with an inorganic compound including an alkaline earth metal is 10.0% or more among all of the metal magnetic particles in the metal magnetic powder.

11. The dust core according to claim 1, wherein in a coating part coating the metal magnetic particles, an amount of the alkaline earth metal is 25.0 mass% or more, when a total amount of a metal element included in the coating part is 100 mass%.

12. The dust core according to claim 5, wherein $0.0055 < Sc/Sm < 0.0950$.

13. The dust core according to claim 5, wherein $0.0300 < Sc/Sm < 0.0750$.

14. The dust core according to claim 1, which has a rust area ratio of 15% or less.

15. The dust core according to claim 1, which has a rust area ratio of 10% or less.

16. The dust core according to claim 1, which has a rust area ratio of 7.5% or less.

17. The dust core according to claim 1, which has a rust area ratio of 5.0% or less.

* * * * *